Jan. 24, 1967 B. McCOLLUM 3,300,753
METHOD OF FREQUENCY DISCRIMINATION
Filed May 22, 1964 4 Sheets-Sheet 1
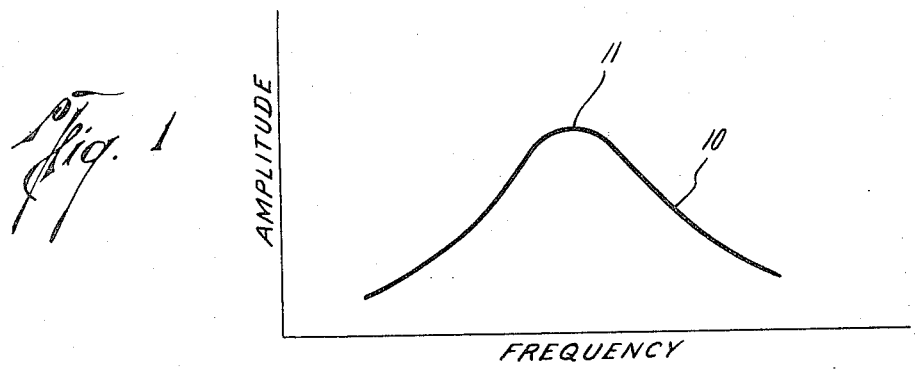
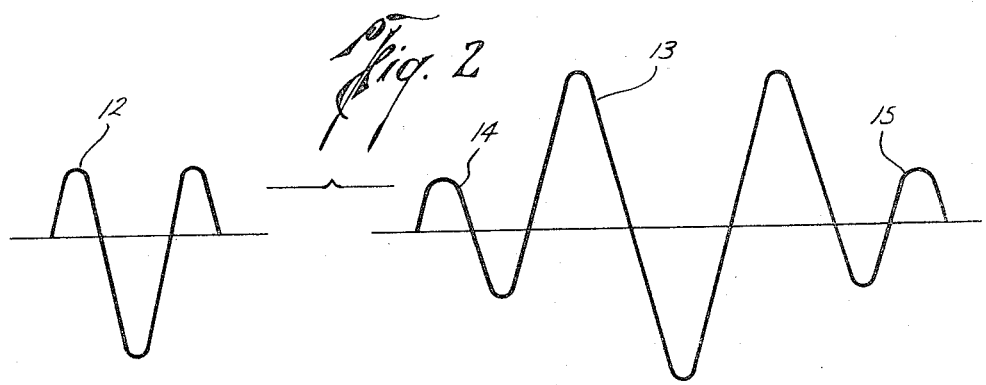
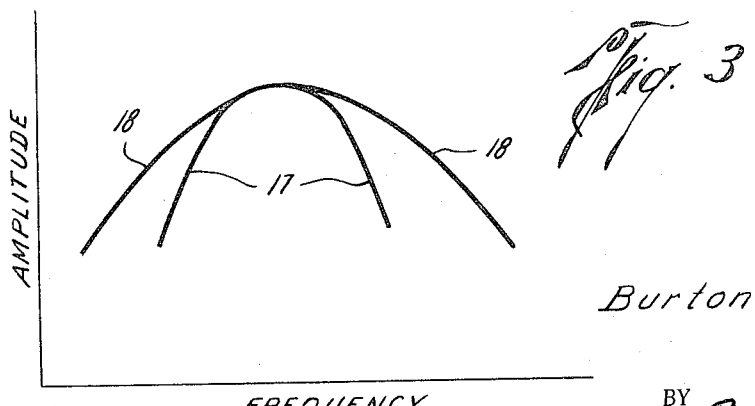
Burton McCollum
INVENTOR.
BY Bertram H. Mann
ATTORNEY

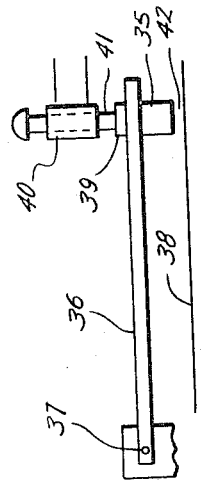
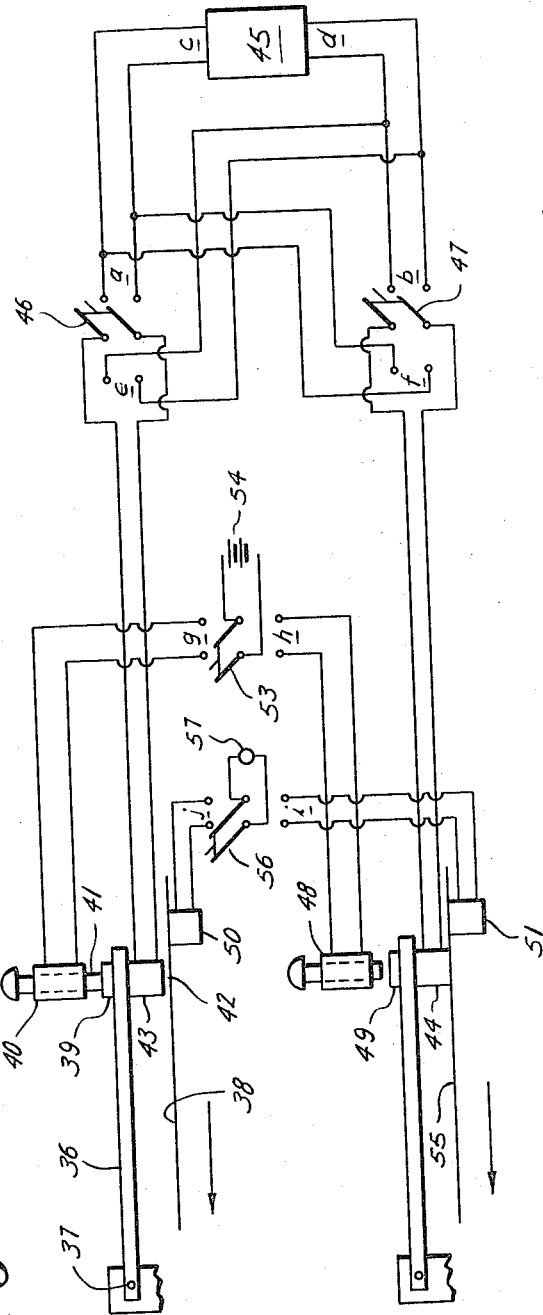
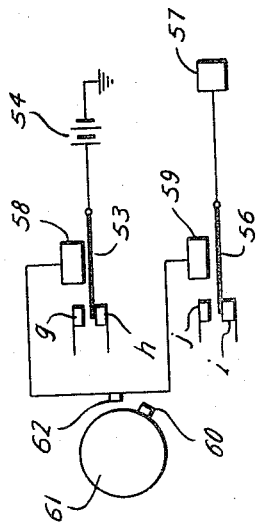
Fig. 7
Fig. 8
Fig. 9
Burton McCollum
INVENTOR.
BY Bertram N. Mann
ATTORNEY

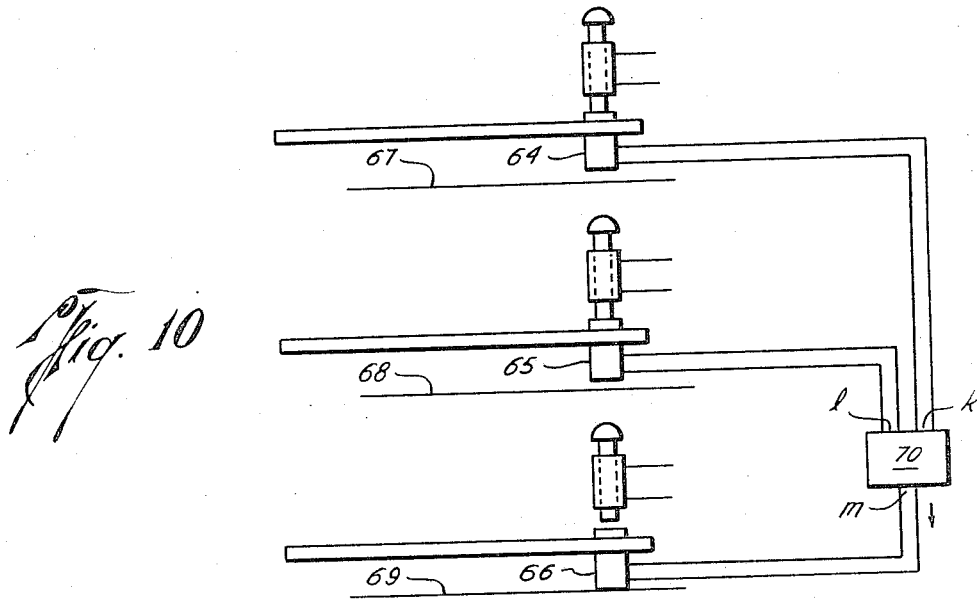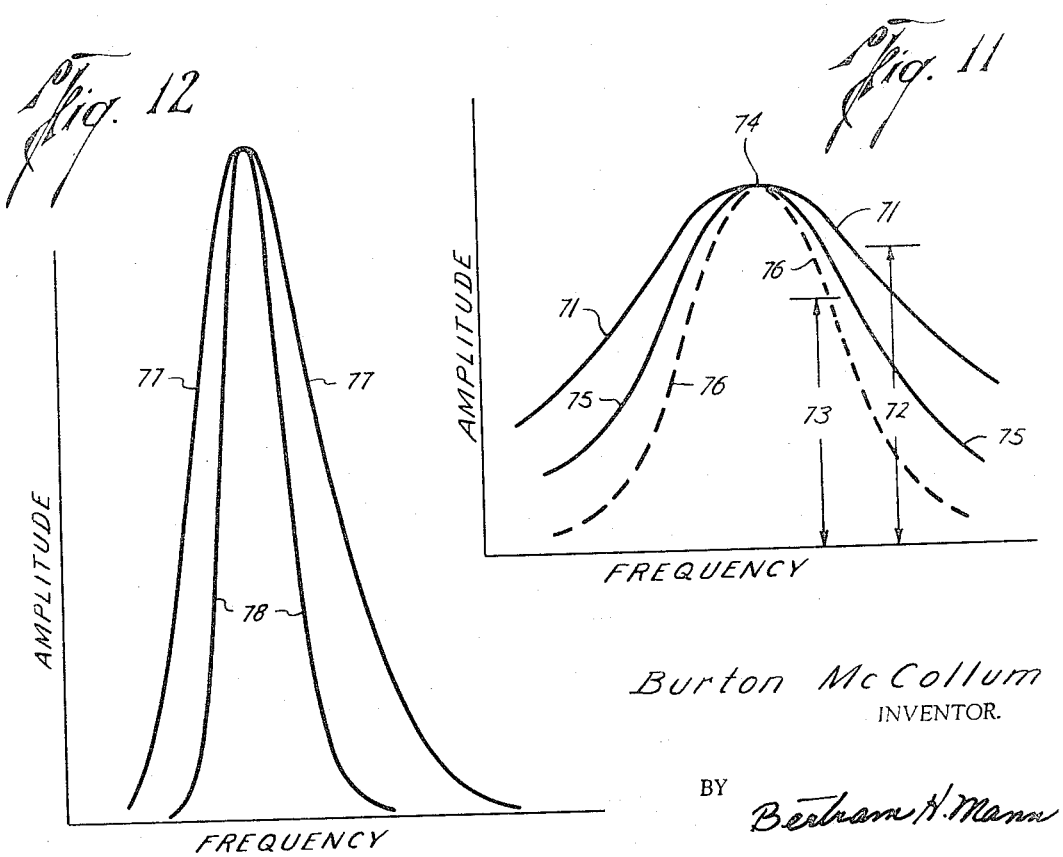

United States Patent Office 3,300,753
Patented Jan. 24, 1967

3,300,753
METHOD OF FREQUENCY DISCRIMINATION
Burton McCollum, Houston, Tex.; P. R. Rowe & Bank of the Southwest National Association, Houston, executors of said Burton McCollum, deceased
Filed May 22, 1964, Ser. No. 369,384
9 Claims. (Cl. 340—15.5)

This invention relates to the art of detection and isolation of vibratory signals, particularly where accompanied by unwanted vibratory energy or noise.

In many industrial operations it is often necessary to detect weak sonic type signals in the presence of overriding noise energy, and in many cases the noise is of such magnitude in relation to the signals that it become difficult or impossible to detect the signals. In most cases it is possible to use signals in which most of the energy is in a comparatively narrow frequency band, whereas the noise usually embraces virtually all frequencies within wide limits. In practice, conventional filters are used to pass selectively the frequencies close to the signal frequency and reduce the amplitudes of all other frequencies. This is accomplished to a limited degree by the use of conventional band pass filters. In the use of such filters severe limitations are encountered due to the fact that filters heretofore available depend on the principle of electrical resonance, and it is well known that such filters cause marked changes in the character of the signals due to the fact that if they were designed to give sharp frequency discrimination they exhibit a high degree of resonant buildup and exponential decay that completely changes the character of the signals and greatly prolongs their duration. These effects are very objectionable in all cases where, as is usually the case, it is important that the signals conserve elements of character.

I have developed a new and very superior technique for accomplishing frequency discrimination whereby I am able to obtain very sharp filtration without appreciable modification of the character of a detected signal of known frequency. In principle, my discriminator departs entirely from the conventional filtration method of electrical resonance. Instead, I make use of certain phenomena involved in the magnetic recording and playback of electrical functions by suitable magnetic recording methods, whereby a sharp frequency discrimination is obtained. The novel method comprises the steps of recording a signal and noise function with or without substantial conventional filtration and repeatedly playing back and re-recording the function, the playback head in each instance being spaced a controlled distance from its record to accentuate the known signal frequency. A variant of this technique comprises compositing certain pairs of playback functions in order to further improve the frequency discrimination. These steps may be repeated a few times, if necessary, without damaging the signal. Further discrimination may be accomplished by multiplying the ultimately derived function by itself as many times as necessary. By the use of these methods, I am able to achieve very sharp frequency discrimination without appreciable degradation of signal character. The technique can be used in all cases where a magnetic recording can be made of the function being processed. It is uniquely useful in such fields as seismic exploration of subsurface geology where magnetic records are otherwise essential to the operations. My invention is described in the annexed specification, reference being made to the accompanying drawings.

Of the drawings:

FIGS. 1 to 3, inclusive, illustrate graphically certain well-known limitations of conventional filters;

Figure 4:
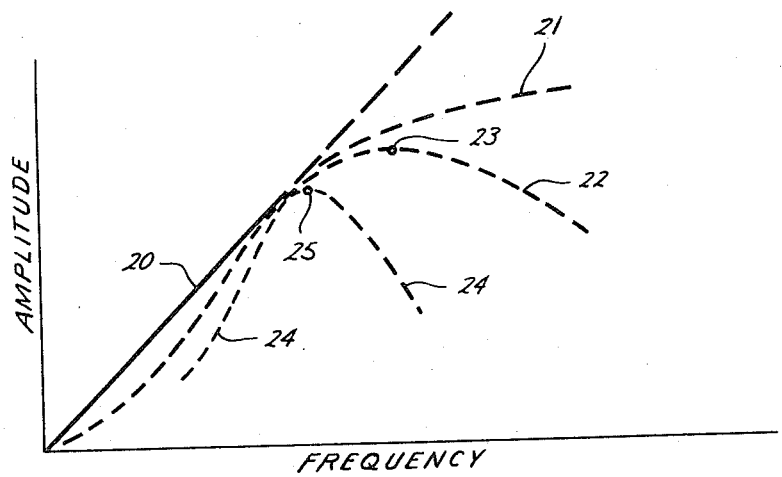
FIG. 4 illustrates a new approach to the problem of frequency discrimination.

FIGS. 7 to 10, inclusive, illustrate means for accomplishing the essential procedures of the invention;

FIG. 11 illustrates another principle that can be used in cooperation with the other techniques herein disclosed to further improve the results of the processing; and FIG. 12 illustrates the results that can be achieved by the use, in combination, of the several principles herein described.

Referring to FIG. 1, 10 illustrates a typical characteristic output curve of a conventional resonant band pass filter. If voltage functions of variable frequency be passed through the filter, the amplitude of the output will vary substantially, as illustrated by curve 10, where, at a certain predetermined frequency marked by 11, the output is a maximum. A typical signal input comprising a truncated wave train is shown at 12 in FIG. 2, and the output is illustrated in principle by 13. The term "truncated wave train" means a wave train of predetermined number of wave lengths or time duration. It is seen that the signal undergoes resonant buildup in the earlier portions of the output in the zone 14, followed by a gradual decay in the later portions 15. Thus, the character of the signal has undergone a radical change and its duration has been greatly increased. It is well known that the sharper the frequency discrimination for which the filter is designed, the more pronounced will be the deformation of the signal. Such deformation of the signal character is particularly objectionable in the art of seismic exploration where the reflected signals often come in at such short intervals that any prolongation of the signals introduces serious problems due to overlap.

FIG. 3 illustrates another serious limitation of conventional filters, particularly for seismic exploration work. In many cases it is desirable to use signals that are brief pulses, such as that shown at 12 in FIG. 2. It is well known that when using signals of this type the frequency discrimination of conventional filters is much less effective than when longer wave trains are used. Curve 17 (FIG. 3) illustrates the frequency discrimination characteristics for the case of a truncated wave train having a duration of several cycles or more, and curve 18 illustrates the characteristic for a briefer pulse. It will be noted that the frequency discrimination, with the use of conventional filters, is much less effective for the brief pulse than for the longer signal. With the briefer pulse, the signal deformation of the type shown at 13, 14, and 15 in FIG. 2 is still very objectionable. These difficulties and limitations that go with the use of conventional filters can be entirely avoided by the use of certain new frequency discrimination techniques which are described below. To accomplish these results, I make use of certain phenomena associated with the recording and playback of electrical functions by magnetic recorders, particularly by the method known as direct recording. In this method of recording, no carrier wave trains, such as involved in amplitude modulation or frequency modulation techniques, are used. The signal is impressed directly on the magnetic recording medium. Usually there is superposed on the signals a sustained voltage wave train of constant amplitude and very high frequency in comparison with the signal frequency. This is known as the bias voltage and is for the purpose of preventing distortion due to hysteresis effects in the recording medium. In the description that follows, it is understood that such a biasing voltage is used whether specifically so stated in any particular case.

When a voltage function is recorded on a magnetic medium by the method of direct recording, the intensity of magnetization at any point is proportional to the strength of the signal function and is independent of the frequency. However, when the record is played back in a conventional manner, the voltage output is proportional to the first derivative of the magnetic record which, of course, is directly proportional to the frequency. Under practical conditions this played-back function takes the form shown by the line 20, in FIG. 4. Theoretically, if there were no modifying phenomena this would be a straight line, and this is substantially the case in the lower frequency range as shown, but in practice, certain phenomena come into play that cause the playback voltage to deviate from the linear relationship, as illustrated by the dashed line 21. This effect is due to a plurality of causes, such as (1) the width of the gap in the recording or playback heads; (2) the rate of movement of the magnetic recording medium in relation to the frequency of the function being recorded; and (3) the coercive force of the magnetic medium. This non-linear characteristic is well known but it has heretofore been regarded as a liability to be minimized as much as possible. In the present invention, I use this phenomenon as a base on which to build a new and very superior frequency discrimination technique, as described below.

The characteristic curve 21 may be considered to have a certain value in special cases, for minimizing very low frequency noises in the region of the straight line portion 20, but this is entirely inadequate to meet most practical requirements. I have found that the frequency discrimination can be substantially improved by holding the playback head out of contact with the magnetic recording medium, thereby giving a response curve of the character shown by curve 22, which is seen to pass through a maximum at a point 23 thereby yielding a band pass effect of a low order of effectiveness. This spacing of the playback head away from the recording medium is of great importance in another respect, in that it provides a means for controlling the critical frequency at which the peak output occurs. By varying the magnitude of the spacing, we can cause the peak frequency to vary within wide limits. This is illustrated in FIG. 4. If a certain spacing between the playback head and the recording medium be used to cause the curve 22 to pass through a maximum at the point 23, then by increasing this spacing, the characteristic curve will take the modified form 24 which shows a peak value at a lower frequency marked by 25. Conversely, reducing the spacing will cause the peak output to shift to a higher frequency.

Figure 5:
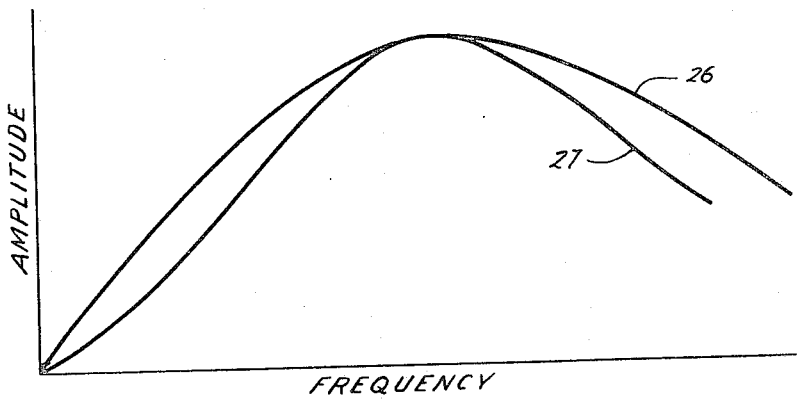
FIG. 5 illustrates further aspects of this technique.

This technique of playing back the recorded function through a head out of contact with the magnetic recording medium is, by itself, a substantial value as a frequency discriminator in many cases, but it usually falls far short of practical requirements. The frequency discrimination can be greatly accentuated by multistaging the operation. This is illustrated in FIG. 5. The first playback 26 of FIG. 5 can be re-recorded and again played back in the same manner, giving the characteristic curve 27, which shows a better frequency selectivity. The process can be repeated as many times as desired with progressive increase in frequency discrimination. There are, however, practical limits to the number of playbacks that can be used. If carried too far, it becomes time consuming and expensive, but more serious limitation is due to the fact that with each sequential playback a certain amount of instrument noise and signal distortion is introduced into the record so that too many playbacks damage the signals. However, the method of sequential playbacks is of substantial value in cases where the requirements as to frequency discrimination are not too severe. In cases where a very sharp frequency discrimination is required, the above limitations can be avoided and a greatly improved frequency discrimination achieved by the use of certain other principles, one of which is illustrated in FIG. 6.

Figure 6:
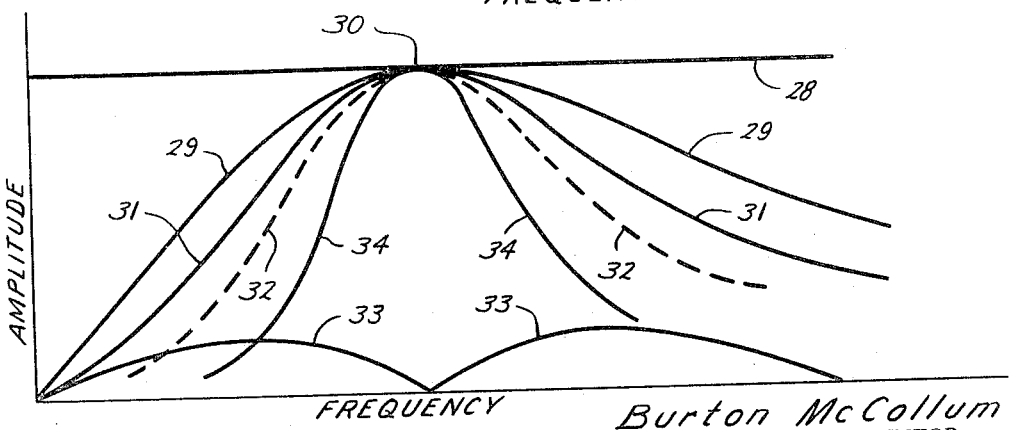
FIG. 6 illustrates essential procedural steps in accomplishing my invention.

Referring to FIG. 6, we assume, for purposes of illustration, that we have recorded a signal-noise function received from a detector spread without intermediate filtration and in which the noise elements embrace a wide range of frequencies, the average amplitudes of which are shown by the line 28, which represents the intensity of magnetization. If this is played back as described above, with the playback head held at a proper distance away from the magnetic recording medium, we will have a function exemplified by the curve 29, the amplitude of which varies considerably with varying frequency, and shows a peak value at 30, the desired signal frequency. If now the function 29 be recorded and again played back in like manner, we will have the curve 31. If this playback be adjusted to have the same peak amplitude as curve 29, its amplitude at all other points will fall below curve 29 by varying amounts, as shown. This holds true throughout the entire frequency range under consideration. We now play back the function 31 in the same manner and derive the function 32, which shows a still sharper frequency selectivity. We next play back simultaneously the functions 29 and 32, in opposition to each other, as, for example, by playing both functions into a differential amplifier. We then have a difference function, as illustrated by curve 33. This difference function is subtracted from curve 32, in any of several ways. We can, for example, record this difference function and then play back both the difference function 33 and the function 32 into a differential amplifier. This yields the function 34, which falls below the function 32, by very substantial amounts. By a proper choice of amplification factor for the difference function 33, the curve 34 can be made to yield a much sharper frequency discrimination than curve 32 from which it was derived. If desired, the operation can be repeated using the filtered function 34 as the prime record instead of the original prime function 29. By the use of this difference technique it is possible to obtain a given degree of frequency discrimination with fewer playbacks than are required by the method described in reference to FIG. 5. It should be noted that each successive playback represented by the curves 29, 31, 32, et cetera, is the first derivative of the one immediately preceding it, and since a single derivative results in a 90° phase shift, any two successive playbacks are in quadrature with each other. However, alternate playbacks are displaced 180° and when added algebraically yield the difference between the two functions.

The operation described above can be further clarified by listing the following essential steps:

(1) Use direct recording technique throughout the operation. All playbacks of recorded functions are made through heads held a proper distance away from the recording medium, and all recordings are made with heads riding substantially in contact with said medium.

(2) Play back a recorded function corresponding to the function 28 of FIG. 6 to derive function 29.

(3) Play back function 29 and re-record to derive the function 31.

(4) Play back the function 31 and re-record as function 32.

(5) Simultaneously play back both the function 29 and the function 32 and combine the two playbacks in opposition to give the difference between the two functions to derive the difference function 33.

(6) Simultaneously play back the difference function 33 in opposition to the function 32 to get a second difference function and record this second difference function as the final product of the cycle of operations.

This last recorded function under Paragraph 6 is a partially filtered function that can be used, if desired, without further processing, or it may be used as a new starting point for a repetition of the operating cycle to obtain a still greater degree of frequency discrimination.

In order that the recording and playback heads may be properly controlled in their positions with respect to the magnetic recording medium, they are movably mounted in a manner functionally equivalent to the arrangement shown in FIG. 7.

The head 35 is carried on an arm 36, slightly movable about the point 37. Normally the head is held in contact with the recording track 38, either by gravity, or by a spring controlling the arm 36. A magnetic armature 39 is attached to the bar 36, and above this armature is mounted a solenoid 40 which, when energized, will lift the head mount and hold it against the adjustable stop 41. The stop is adjusted to give the desired spacing in the gap 42 between the head 35 and the recording track 38. All other heads are similarly mounted.

For executing the multistaging operations illustrated in FIG. 5, a preferred apparatus is illustrated in FIGS. 8 and 9 wherein are shown two recording heads 43 and 44, mounted as shown in FIG. 7 and connected to a transfer amplifier 45 through a pair of 2-pole double throw switches 46 and 47. An examination of the diagram shows that when the switches 46 and 47 are thrown, respectively, to their positions a and b, head 43 is connected to the input c of the amplifier 45, and head 44 is connected to the output d of this amplifier. In this position the record played back from head 43 is recorded through head 44. When the switches are thrown to their opposite positions e and f, the record is played out of head 44 into head 43. A solenoid and armature 48 and 49 are provided for controlling head 44, and erasing heads 50 and 51 are also provided. Provision is made for the execution, in proper sequence, of the three essential operations involved. These are: (1) the switching of the recording and playback heads 43 and 44 alternately between input and output of the transfer amplifier 45; (2) the simultaneous switching of the erase function; and (3) the simultaneous switching of the solenoids 40 and 48 controlling the heads to provide the proper spacing relationship between the recording media and their playback heads, as above described in reference to FIG. 7.

Since, as explained above, all playbacks are made with heads held out of contact with the magnetic tracks while all recordings are made with heads substantially in contact with the tracks, armature 39 for head 43 is held up against the stop 41 by energization of solenoid 40 while solenoid 48 is de-energized. This is accomplished by the 2-pole double throw switch 53 which alternately connects a power source 54 through switch contacts g and h to solenoids 40 and 48. It is necessary to provide for erasure of the track used for recording in advance of the recording. It is here assumed that the recording tracks move in the direction of the arrows. This erasure is accomplished by means of the 2-pole double throw switch 56 which is alternately thrown to positions i and j, thereby connecting the erase oscillator 57 to erase heads 50 and 51. The operation of these switches in the manner described is accomplished through the use of stepping relays or other powered switches, conventionally designated 58 and 59 in FIG. 9, in a conventional manner. The operation may be controlled by a trigger device 60 mounted on the recorder drum 61 (FIG. 9) to actuate the stepping relays 58 and 59 through switch device 62 once each revolution of the recording drum. On successive revolutions of the drum, all of the switches and the functioning of the heads are reversed. In practice, the control trigger is set to continue the operation for any predetermined number of cycles, after which the trigger is de-activated by means of another stepping relay in a conventional manner. All of the above-mentioned switching operations as well as all others described in this specification are made by well-known conventional equipment and procedures.

In many cases, the operation described in reference to FIGS. 8 and 9 will be sufficient for practical purposes. However, in other cases where the signal-to-noise ratio is very small, the number of sequential playbacks required may be so great that the character of the signals may be degraded to an objectionable degree. In such cases, other techniques involving the same basic principles as set out above, but designed to yield a sharper frequency discrimination with a fewer number of playbacks, can be used. One method of accomplishing this is illustrated in FIG. 10. In this description, the means for elevating the heads are assumed to be the equivalent of that described above. Also, all erasures are accomplished by conventional procedures that do not require repetition.

The complete cycle of this particular operation embodies three phases and requires three heads 64, 65, and 66, cooperating with tracks 67, 68, and 69, respectively, of FIG. 10. The first phase is identical with the first operation described above in reference to FIG. 6, in which the functions represented by the curves 29 and 32 are derived and recorded, as for example, on tracks 67 and 68. The next objective is to derive the first difference function 33 of FIG. 6 by taking the difference between the functions 29 and 32. To accomplish this, we play back from heads 64 and 65, into the two inputs k and l of the differential amplifier 70, the output m of which is connected to head 66. We now have function 29 (FIG. 6) recorded on track 67, function 32 recorded on track 68, and the first difference function 33 of FIG. 6 on track 69. This difference function is in quadrature with function 32 and must be brought into phase before it can be utilized. We now erase track 67 and play back the difference function from track 69 to track 67. This can be accomplished by the procedure illustrated in FIG. 8. Due to the differentiating effect of the playback, the difference function is now in phase with function 32 and can be subtracted from it. To accomplish this, we play back function 32 from track 68 and the difference function from track 67 into the two input terminals of the differential amplifier 70, thereby deriving a second difference corresponding to function 34 of FIG. 6. This completes the cycle.

The techniques hereinabove disclosed will, in many cases, give the needed frequency discrimination without objectionable degrading of signal character. However, under very bad noise conditions, the number of playbacks required may be sufficient to do material damage to the signals. In such cases I prefer to use, in cooperation with the principles above set out, a supplementary technique that further improves the frequency selectivity without further playbacks. The principle involved is illustrated in FIG. 11 in which curve 71 is assumed to represent the frequency response of any filter, but preferably a filtering system of the type disclosed above. For simplicity in explaining the principle involved, we assume that we pass into this filter a function in which the amplitudes of all the different frequency components are the same. At the output, the amplitudes of the components of any particular frequency will be represented by the ordinate 72. If now we multiply the function by itself, the resulting ordinate at the same frequency will be the ordinate 73, which is 72 multiplied by itself and divided by the peak ordinate 74 to bring the multiplicand function to the desired range. In other words, the resulting response function will be the square of the function 71. This is exemplified by the curve 75 which shows a much sharper frequency selectivity than curve 71. If the operation be repeated in like manner, we achieve the frequency characteristic represented by curve 76, which shows a still sharper frequency selectivity.

This procedure of multiplying the function by itself can be repeated as many times as desired with progressively improved frequency discrimination. By a suitable combination of the techniques hereinabove disclosed, a very sharp frequency discrimination can be obtained with virtually no degradation of signal character. The use of this method of multiplying a function by itself is useful only in those cases where the signal-to-noise ratio is greater than unity. It is therefore to be regarded as supplementary to the prior use of frequency discrimination processes. Subject to this limitation it has been found to be of substantial utility in improving signal-to-noise ratios.

The above-discussed technique of multiplying the function by itself can be used to achieve important results quite apart from frequency discrimination. This is treated at length in my copending application entitled "Method of Seismic Exploration," Serial No. 315,620, filed October 11, 1963, now Patent No. 3,274,543. In that specification there are disclosed certain measures that have to be taken to accomplish the multiplication process without damage to signal character, and those considerations apply also the use of the technique as a means of frequency discrimination.

FIG. 12 shows specific examples of the improvement of frequency selectivity that can be obtained by the use of the techniques disclosed above. Curve 77 is typical of the frequency characteristic that can be achieved by the use of eight sequential playbacks made in the manner hereinabove described. If we follow these playbacks by two stages of multiplication, the much improved frequency selectivity shown by curve 78 results. Further, by using the combination of sequential playback and multiplication techniques, we achieve not only a high degree of frequency selectivity without material damage to the signals, but we also gain the further advantages set out in the copending application above referred to.

It is contemplated that only those steps of the above-described will be used as are necessary to produce the desired resolution and/or accentuation of the signal with respect to the noise components of the detected energy. Much of the equipment specified is more or less conventional. The terms "desired" and "other" frequencies include bands of frequencies, the aim of the invention being to emphasize, as far as possible, the signal reflection event itself, or a narrow band of frequencies including the signal frequency. The invention may be modified in these and other respects as will occur to those skilled in the art, and the exclusive use of all modifications as come within the scope of the appended claims is contemplated.

I claim:
1. The method of resolving a detected vibratory signal event of known frequency mixed with noise energy comprising the steps of making a first magnetic record of the detected energy function by direct recording method, adjusting a playback head to be spaced a predetermined distance which accentuates the signal frequency and damps all other frequencies, playing back said first record through said playback head, and making a secondary record from the output of said playback head.

2. The method steps described in claim 1 repeated, each successive secondary record being derived from the preceding secondary record by spacing a playback head said predetermined distance from said preceding record.

3. The method described in claim 2 in which each record of the series is made by placing a recording head substantially in contact with its record.

4. The method described in claim 2 in which the final secondary record is played back through a voltage function multiplier of the type for squaring the affected function and the output of said multiplier is re-recorded to further improve the frequency discrimination.

5. The method described in claim 2 including the further steps of recording the difference function between nonconsecutive secondary recordings 180 degrees out of phase, and making a still further record of the difference function between said previous difference function recording and the more sharply tuned of said secondary recordings.

6. The method described in claim 5 in which the difference function on said final record is repeatedly squared by utilizing voltage function multiplication until the signal is of the required distinctiveness in the derived function.

7. The method of resolving a vibratory signal of known frequency mixed with noise energy comprising applying a mixed signal and noise function to a first record track through a first head in a predetermined recording position, repositioning said first head to provide a predetermined, increased playback gap between said first head and said first record track to accentuate a desired signal frequency while attenuating other frequencies, playing back said first record track through said repositioned first head, and recording the playback from said repositioned first head.

8. The method described in claim 7 further including the steps of erasing said second record, adjusting said second head to said recording position with respect to said second record, and playing back and re-recording said first record upon said second record through said first and second heads respectively in said playback and recording positions.

9. The method described in claim 8 including the further steps of successively repeating the readjustment of the recording and playback heads after playing back one record track onto the other record, erasing the played back record, and playing back the last recorded record upon the erased record to progressively improve the resolution of the reflected signal event.

References Cited by the Examiner
UNITED STATES PATENTS

| | | | |
|---|---|---|---|
| 2,643,130 | 6/1953 | Kornei | 274—41.4 |
| 2,657,276 | 10/1953 | Eliot et al. | |
| 3,045,207 | 7/1962 | Peterson. | |

BERNARD KONICK, *Primary Examiner.*

L. G. KURLAND, *Assistant Examiner.*